United States Patent
Few et al.

(10) Patent No.: US 11,613,598 B2
(45) Date of Patent: Mar. 28, 2023

(54) AZIDE-FUNCTIONALIZED POLYMER AND PROCESS OF MAKING AND USING THEREOF

(71) Applicant: BRASKEM AMERICA, INC., Philadelphia, PA (US)

(72) Inventors: Chip Few, Pittsburgh, PA (US); Steve Krupinski, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 272 days.

(21) Appl. No.: 16/881,519

(22) Filed: May 22, 2020

(65) Prior Publication Data

US 2020/0369815 A1 Nov. 26, 2020

Related U.S. Application Data

(60) Provisional application No. 62/852,042, filed on May 23, 2019.

(51) Int. Cl.
*C08F 255/02* (2006.01)
*C08K 5/00* (2006.01)
*C08K 5/14* (2006.01)

(52) U.S. Cl.
CPC .......... *C08F 255/02* (2013.01); *C08K 5/0025* (2013.01); *C08K 5/14* (2013.01)

(58) Field of Classification Search
CPC .... C08F 255/02; C08F 255/00; C07C 247/00; C07C 247/02; C07C 247/08; C07C 247/10
See application file for complete search history.

(56) References Cited

U.S. PATENT DOCUMENTS

| 5,140,074 | A | * | 8/1992 | DeNicola, Jr. | ........ C08F 255/00 525/283 |
| 5,324,755 | A | | 6/1994 | Kilius et al. | |
| 2006/0148993 | A1 | | 7/2006 | Ciardelli et al. | |
| 2008/0076874 | A1 | * | 3/2008 | Syed | ........ C08F 255/02 525/70 |
| 2014/0206251 | A1 | * | 7/2014 | Stokes | ........ B01D 69/12 525/291 |
| 2015/0240006 | A1 | * | 8/2015 | Carlson | ........ C07D 207/36 540/454 |
| 2016/0264688 | A1 | * | 9/2016 | Beek | ........ C08F 8/30 |
| 2018/0086887 | A1 | | 3/2018 | Beek et al. | |
| 2018/0298120 | A1 | | 10/2018 | Few et al. | |

FOREIGN PATENT DOCUMENTS

| EP | 3590977 A1 | 1/2020 |
| WO | 2014113618 A1 | 7/2014 |

OTHER PUBLICATIONS

Cai, Polymer 47 (2006) p. 7043-7050 (Year: 2006).*

* cited by examiner

*Primary Examiner* — Robert C Boyle
(74) *Attorney, Agent, or Firm* — Jeffrey N. Townes; Cozen O'Connor

(57) ABSTRACT

This invention relates to a process for forming an azide-grafted polymer. The process comprises mixing a free-radical-reactive polymer with a free-radical initiator and an azide monomer that contains at least one unsaturated C=C bond capable of reacting with a radical, under solid-state grafting conditions, to form an azide-grafted polymer. The formed azide-grafted polymer can be used to prepare a long-chain branched or cross-linked polymer.

25 Claims, No Drawings

AZIDE-FUNCTIONALIZED POLYMER AND PROCESS OF MAKING AND USING THEREOF

This application claims priority to U.S. Provisional Patent Application No. 62/852,042, filed on May 23, 2019, which is herein incorporated by reference in its entirety.

FIELD OF THE INVENTION

This invention relates generally to the field of making and using an azide-functionalized polymer.

BACKGROUND OF THE INVENTION

Polymers, such as polyolefins, may be functionalized by a grafting process using monomeric, functional-group-containing compounds.

Known grafting processes include graft polymerization in organic solution and in aqueous suspension or in polymer melts. The main disadvantage of the graft polymerizations in solution and in aqueous suspension lies in their inefficiencies, especially due to the large amounts of solvents or suspending agents involved, which need to be separated and recovered after the grafting reaction. Additionally, grafting processes in polymer melts, e.g., in isotactic polypropylene melts, may undergo polymer degradation via chain scission reaction, due to the high process temperature.

There thus remains a need in the art to develop an improved grafting process to prepare azide-functionalized polyolefins that are cost-efficient and have reduced degradation. This invention answers those needs.

SUMMARY OF THE INVENTION

One aspect of the invention relates to a process for preparing an azide-grafted polymer. The process comprises mixing a free-radical-reactive polymer with a free-radical initiator and an azide monomer under solid-state grafting conditions to form an azide-grafted polymer. The azide monomer contains at least one unsaturated C=C bond capable of reacting with a radical.

Another aspect of the invention relates to an azide-grafted polymer prepared according to the processes as discussed in the above aspect of the invention. The process comprises mixing a free-radical-reactive polymer with a free-radical initiator and an azide monomer under solid-state grafting conditions to form an azide-grafted polymer. The azide monomer contains at least one unsaturated C=C bond capable of reacting with a radical.

Another aspect of the invention relates to a process of preparing a long-chain branched polymer. The process comprises reacting a polyolefin base polymer with a coupling agent comprising a polymeric coupling agent, optionally blended with a molecular coupling agent, to couple the polyolefin base polymer with the coupling agent to form a long-chain branched polymer having a long-chain branching and/or higher surface energy relative to the polyolefin base polymer. The polymeric coupling agent is an azide-grafted polymer, prepared by a process comprising mixing a free-radical-reactive polymer with a free-radical initiator and an azide monomer that contains at least one unsaturated C=C bond capable of reacting with a radical, under solid-state grafting conditions.

Another aspect of the invention relates to a process of preparing a polymer, comprising exposing an azide-grafted polymer to a temperature at or above the decomposition temperature of an azide-grafted polymer to form nitrenes from the azide group of the azide-grafted polymer that react with the azide-grafted polymer to form a long-chain branched or crosslinked polymer. The azide-grafted polymer is prepared by a process comprising mixing a free-radical-reactive polymer with a free-radical initiator and an azide monomer that contains at least one unsaturated C=C bond capable of reacting with a radical, under solid-state grafting conditions.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

Process of Preparing an Azide-Grafted Polymer

One aspect of the invention relates to a process for preparing an azide-grafted polymer. The process comprises mixing a free-radical-reactive polymer with a free-radical initiator and an azide monomer under solid-state grafting conditions to form an azide-grafted polymer. The azide monomer contains at least one unsaturated C=C bond capable of reacting with a radical.

Free-Radical-Reactive Polymer

The free-radical-reactive polymer feedstock used in the process may be any polymer having C—H bonds in the backbone. Suitable free-radical-reactive polymers include, but are not limited to, a polyolefin, polydiene, or a blend thereof; a copolymer of olefin monomer(s) and/or diene monomer(s), optionally with an vinyl monomer; a polymer of a styrenic monomer; a copolymer of styrenic monomer(s) with olefin monomer(s), diene monomer(s), or acrylic monomer(s); a halogen-containing polymer; or a polymer or copolymer derived from α,β-unsaturated acid(s) or derivatives thereof, optionally with another unsaturated monomer or other polymer containing a carbon-hydrogen bond capable of reacting with a free radical.

Suitable polyolefin polymers include those prepared from linear or branched α-olefins having 2 to 20 carbon atoms, 2 to 16 carbon atoms, or 2 to 12 carbon atoms. Exemplary olefin monomers are ethylene, propylene, 1-butene, 2-butene, 2-methylpropene (isobuylene), 1-pentene, 3-methyl-1-butene, 1-hexene, 4-methyl-1-pentene, 3-methyl-1-pentene, 4,6-dimethyl-1-heptene, 1-octene, 1-decene, 1-undecene, 1-dodecene, 1-tetradecene, 1-hexadecene, 1-octadecene, 1-eicocene, and combinations thereof. These olefin monomers may each contain a heteroatom such as an oxygen, nitrogen, or silicon atom. Additional polyolefins also include polymers of cycloolefins, for instance, polymers of cyclopentene or norbornene. The polyolefins may have a number average molecular weight of greater than 5,000 g/mol, greater than 10,000 g/mol, greater than 20,000 g/mol, greater than 30,000 g/mol, greater than 40,000 g/mol, or greater than 50,000 g/mol.

Suitable polydiene polymers include those prepared from diolefins containing 4 to 24 carbon atoms, 4 to 16 carbon atoms, or 4 to 12 carbon atoms. Exemplary diolefin monomers are 1,3-butadiene; 1,3-pentadiene; 1,4-pentadiene; 2-methyl-1,3-butadiene (isoprene); methylpentadiene or dimethylpentadiene (e.g., 3-methyl-1,4-pentadiene; 3,3-dimethyl-1,4-pentadiene); 1,3-hexadiene; 1,4-hexadiene; 1,5-hexadiene; methylhexadiene or dimethylhexadiene (e.g., 3-methyl-1,5-hexadiene; 3,4-dimethyl-1,3-hexadiene; 3,4-dimethyl-1,5-hexadiene; 1,3-heptadiene; 1,4-heptadiene; 1,5-heptadiene; 1,6-heptadiene; 1,3-octadiene; 1,4-octadiene; 1,5-octadiene; 1,6-octadiene; 1,7-octadiene; and methyloctadiene or ethyloctadiene (e.g., 2-methyl-1,3-octadiene; 3-ethyl-1,5-octadiene; 4,5-diethyl-1,3-octadiene). Additional examples of suitable diolefin monomers may be found in U.S. Pat. No. 5,382,604, which is incorporated herein by reference in its entirety.

The term "polyolefin" or "polydiene" generally embraces a homopolymer prepared from a single type of olefin monomer (or diolefin monomer), as well as a copolymer prepared from two or more olefin monomers (or diolefin monomers). A specific polyolefin (or polydiene) referred to herein shall mean polymers comprising greater than 50% by weight of units derived from that specific olefin monomer (or diolefin monomer), including homopolymers of that specific olefin (or diolefin) or copolymers containing units derived from that specific olefin (or diolefin) monomer and one or more other types of olefin (or diolefin) comonomers. For instance, polypropylene shall mean polymers comprising greater than 50 wt % of units derived from propylene monomer, including polypropylene homopolymers or copolymers containing units derived from propylene monomer and one or more other types of olefin comonomers. For instance, polybutadiene shall mean polymers comprising greater than 50 wt % of units derived from butadiene monomer, including polybutadiene homopolymers or copolymers containing units derived from butadiene monomer and one or more other types of diolefin comonomers. The polyolefin (or polydiene) used herein can be a copolymer wherein the comonomer(s) is/are randomly distributed along the polymer chain, a periodic copolymer, an alternating copolymer, or a block copolymer comprising two or more homopolymer blocks linked by covalent bonds.

The free-radical-reactive polymer can be blends of polyolefins and/or polydienes. The term "blend" or "polymer blend" generally refers to a mixture of two or more polymers. Such a blend may or may not be miscible, and may or may not be phase separated. A polymer blend may or may not contain one or more domain configurations, as determined from transmission electron spectroscopy, light scattering, x-ray scattering, or other methods known in the art. For example, the free-radical-reactive polymer may be a polymer blend of polypropylene and polyisobutylene, a polymer blend of polypropylene and polyethylene (ethylene propylene rubber, EPR) (for example, polypropylene/high density polyethylene, polypropylene/low density polyethylene), or mixtures of different types of polyethylene (for example low density polyethylene/high density polyethylene).

The free-radical-reactive polymer can be copolymers of olefins and/or dienes, optionally with other vinyl monomers. For example, the copolymers may be ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers, and their copolymers with carbon monoxide or ethylene/acrylic acid copolymers and their salts (ionomers), terpolymers of ethylene with propylene and a diene such as hexadiene, dicyclopentadiene or ethylidene-norbornene. These copolymers may be further blended with one or more polyolefins or polydienes discussed above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA, and alternating or random polyalkylene/carbon monoxide copolymers, and mixtures thereof with other polymers, for example polyamides.

The copolymer can be an impact copolymer, i.e., a heterophasic polyolefin copolymer where one polyolefin is the continuous phase and an elastomeric phase is uniformly dispersed therein. This would include, for instance, a heterophasic polypropylene copolymer where polypropylene is the continuous phase and an elastomeric phase is uniformly distributed therein. The impact copolymer results from an in-reactor process rather than physical blending. A polypropylene impact copolymer may contain ethylene comonomer at the amount of at least 5 wt %, or at least 10 wt %; and up to 40 wt %, up to 35 wt %, up to 25 wt %, up to 20 wt %, or up to 15 wt %. Examples of some suitable impact polypropylene copolymers may be found in U.S. Pat. No. 6,593,005, which is incorporated herein by reference in its entirety.

The free-radical-reactive polymer can be polystyrenes, i.e., polymers of styrenic monomers, for instance, polystyrene, poly(p-methyl styrene), poly(α-methylstyrene), or poly(p-sec-butyl styrene).

The free-radical-reactive polymer can be copolymers of a styrenic monomer with olefin monomer(s), diene monomer(s), or acrylic monomer(s) as comonomer(s). For example, the free-radical-reactive polymer may be copolymers of styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate. The free-radical-reactive polymer may be a blend of high impact strength of styrene copolymers and another polymer, for example, a polyacrylate, a diene polymer, or an ethylene/propylene/diene terpolymer. The free-radical-reactive polymer may be block copolymers of styrene, such as styrene/butadiene, styrene/butadiene/styrene, styrene/isoprene/styrene, styrene/ethylene/butylene/styrene (SEBS), or styrene/ethylene/propylene/styrene.

The free-radical-reactive polymer can be halogen-containing polymers, such as polychloroprene, chlorinated rubbers, chlorinated or brominated copolymer of isobutylene-isoprene (halobutyl rubber), chlorinated or sulfo-chlorinated polyethylene, copolymers of ethylene and chlorinated ethylene, epichlorohydrin homopolymers or copolymers, polymers of halogen-containing vinyl compounds (e.g., polyvinyl chloride, polyvinylidene chloride, polyvinyl fluoride, polyvinylidene fluoride) as well as copolymers thereof, such as vinyl chloride/vinylidene chloride, vinyl chloride/vinyl acetate or vinylidene chloride/vinyl acetate copolymers.

The free-radical-reactive polymer can be polymers or copolymers derived from α,β-unsaturated acids and derivatives thereof, optionally with another unsaturated monomer or other polymer containing a carbon-hydrogen bond capable of reacting with a free radical. For example, polyacrylates and polymethacrylates; polymethyl methacrylates, polyacrylamides and polyacrylonitriles, impact-modified with butyl acrylate; acrylonitrile/butadiene copolymers, acrylonitrile/alkyl acrylate copolymers, acrylonitrile/ alkoxyalkyl acrylate or acrylonitrile/vinyl halide copolymers or acrylonitrile/alkyl methacrylate/butadiene terpolymers.

In certain embodiments, the free-radical-reactive polymer is a polyolefin, polydiene, or a blend thereof; or a copolymer of olefin monomer(s) and/or diene monomer(s). The olefin monomer or diene monomer may be ethylene; propylene; 1-butene; 2-butene; 1,3-butadiene; 2-methylpropene (isobutylene); 1-pentene; 1,3-pentadiene; 1,4-pentadiene; 2-methyl-1,3-butadiene (isoprene); 3-methyl-1-butene; 3-methyl-1,4-pentadiene; 3,3-dimethyl-1,4-pentadiene; 1-hexene; 1,3-hexadiene; 1,4-hexadiene; 1,5-hexadiene; 4-methyl-1-pentene; 3-methyl-1-pentene; 3-methyl-1,5-hexadiene; 3,4-dimethyl-1,3-hexadiene; 3,4-dimethyl-1,5-hexadiene; 4,6-dimethyl-1-heptene; 1,3-heptadiene; 1,4-heptadiene; 1,5-heptadiene; 1,6-heptadiene; 1-octene; 1,3-octadiene; 1,4-octadiene; 1,5-octadiene; 1,6-octadiene; 1,7-octadiene; 2-methyl-1,3-octadiene; 3-ethyl-1,5-octadiene; 4,5-diethyl-1,3-octadiene; 1-decene; 1-undecene; 1-dodecene; 1-tetradecene; 1-hexadecene; 1-octadecene; 1-eicocene; or combinations thereof. The olefin monomer may also be a cyclic olefin, such as cyclooctadiene, norbornene, or substituted norbornene.

In one embodiment, the free-radical-reactive polymer is polyethylene, polypropylene, copolymer of polyethylene and polypropylene, polybutadiene or polyisoprene, polystyrene, styrene block copolymers, ethylene-propylene diene methylene rubber (EPDM rubber), ethylene-propylene rubber (EPR), styrene-butadiene-styrene rubber (SBS rubber), or styrene-ethylene-butylene-styrene rubber (SEBS rubber).

The structure of the free-radical-reactive polymer can vary from crystalline, semi-crystalline, or amorphous. Polymers are composed of long molecular chains which form irregular, entangled coils in the melt. Certain polymers retain such a disordered structure upon freezing and thus convert into amorphous solids. Certain polymers can crystallize upon cooling from the melt, mechanical stretching, or solvent evaporation, in which the chains can rearrange upon freezing and form partly ordered regions. The fraction of the ordered molecules in a polymer is characterized by the degree of crystallinity; and the fraction of the disordered molecules in a polymer can be characterized by the amorphous content. The methods of measuring the degree of crystallinity or amorphous content of the free-radical-reactive polymer are those known in the art, including but not limited to, density measurement, differential scanning calorimetry (DSC), X-ray diffraction (XRD), infrared spectroscopy, nuclear magnetic resonance (NMR), and fractionation technique (e.g., measuring the amorphous or soluble content in xylene—xylene soluble % content).

The degree of crystallinity or the amorphous content that a free-radical-reactive polymer is capable of obtaining is mostly determined by the stereochemical regularity of the hydrocarbyl groups that are pendent to the polymer molecule backbone, i.e., the tacticity of the polymer. Tacticity is the relative stereochemistry of adjacent chiral centers within a polymer, which impacts certain physical properties of the polymer, such as the melting point of the polymer, softening point of the polymer, and how soluble a polymer is in a solvent, etc. The methods of measuring tacticity are similar to the methods of measuring the degree of crystallinity or amorphous content, as discussed above, including, for instance, NMR, XRD, secondary ion mass spectrometry (SIMS), vibrational spectroscopy (e.g., FTIR), etc.

The free-radical-reactive polymer can be an atactic polymer, an isotactic polymer, or a syndiotactic polymer.

Atactic polymers, such as atactic poly-α-olefins, are those wherein the hydrocarbyl groups pendent to the polymer molecule backbone assume no regular order with reference to the backbone. Because atactic polymers exhibit no regular order or repeating unit configurations in the polymer chain, they are amorphous, non-crystalline materials and generally have no measurable melting point.

Isotactic polymers, such as isotactic poly-α-olefins, are those wherein the pendent hydrocarbyl groups are ordered in space to the same side or plane of the polymer backbone chain. Highly isotactic poly-α-olefins are insoluble in xylene and are capable of exhibiting a high degree of crystallinity and are in part characterizable by their melting point temperature. Many commercial forms of polypropylene are isotactic.

Syndiotactic polymers, such as syndiotactic poly-α-olefins, are those wherein the hydrocarbyl groups pendent to the polymer molecular backbone alternate sequentially in order from one side or plane to the opposite side or plane relative to the polymer backbone. Like isotactic poly-α-olefins, syndiotactic poly-α-olefins are capable of exhibiting a high degree of crystallinity and are in part characterized by their exhibition of a melting point temperature.

The free-radical-reactive polymer feedstock can have an amorphous content ranging from 0 to 100%, for instance, from about 1 to about 100%, from about 5 to about 100%, from about 10 to about 100%, from about 15 to about 100%, from about 20 to about 100%, from about 25 to about 100%, from about 30 to about 100%, from about 35 to about 100%, from about 40 to about 100%, from about 45 to about 100%, from about 50 to about 100%, from about 55 to about 100%, from about 60 to about 100%, from about 65 to about 100%, from about 70 to about 100%, from about 75 to about 100%, from about 80 to about 100%, from about 85 to about 100%, from about 90 to about 100%, or from about 95 to about 100%.

In certain embodiments, the free-radical-reactive polymer feedstock has a high amorphous content. For instance, the free-radical-reactive polymer feedstock may be substantially amorphous. That is to say, the polymer has an amorphous content of 40% or more, or a crystallinity of less than 40%, for instance, as measured by DSC against a highly crystalline polymer standard (of the same type of polymer). For instance, in terms of polypropylene, a substantially amorphous polypropylene polymer may be propylene homopolymer, or a copolymer of propylene with one or more α-olefin comonomers (such as ethylene, butene-1, or octene-1). The free-radical-reactive polymer having a high degree of amorphous content can result in a tacky, rubber-like material at room temperature that has a lower density, melting point, and softening temperature than an isotactic polymer.

In one embodiment, the free-radical-reactive polymer feedstock is totally amorphous (atactic). In this embodiment, a totally amorphous (atactic) polypropylene can be used as the free-radical-reactive polymer feedstock. Atactic copolymers of propylene with one or more olefin comonomers may also be used. Commercial available atactic polypropylene and copolymers of propylene with one or more olefin comonomers are supplied by a variety of resources, such as those supplied by REXtac (Orrex, Tex.), which are available in an assortment of viscosities and softening points. Additional amorphous and atactic polymers suitable for use in this invention may be found in JP 4558317B2 and U.S. Pat. No. 9,695,342; which are incorporated herein by reference in their entirety.

Alternatively, the free-radical-reactive polymer feedstock can have an amorphous content of about 99% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, or about 5% or less.

In certain embodiments, the free-radical-reactive polymer feedstock has a low amorphous content and a high degree of crystallinity. For instance, the free-radical-reactive polymer feedstock may be substantially crystalline. That is to say, the polymer has an amorphous content of 40% or less, or a crystallinity of 40% or more, for instance, as measured by DSC against a highly crystalline polymer standard (of the same type of polymer). For instance, in terms of polypropylene, a substantially crystalline polypropylene polymer may be those isotactic polypropylenes with an isotactic index of 85% or above, or an impact copolymer having a typical rubber content of 10-30%. The free-radical-reactive polymer having a high degree of crystallinity can result in a stiffer material that is more resistant to creep than an atactic polymer.

The free-radical-reactive polymer can have a softening point of 70° C. or higher, for instance, about 80° C. or higher, about 90° C. or higher, about 100° C. or higher, or about 110° C. or higher. The softening point or the melting temperature ranges can be approximated from the differential scanning calorimeter (DSC) curve of the polymer. It can be also measured by the methods known in the art, e.g., by Vicat method, Heat deflection test, or a ring-and-ball method. ASTM E28-67 "Standard Method of Test for Softening Point by Ring-and-Ball Apparatus," can be used for the ring-and-ball method. It is desirable that the free-radical-reactive polymer feedstock has a relatively high softening point so that the grafting process can be carried out below the softening point of the free-radical-reactive polymer.

Free-Radical Initiators

Suitable free-radical initiators include an organic peroxide or an organic diazo compound. These are thermal free radical initiators that are relatively stable at room temperature but would decompose rapidly at the grafting-process temperature.

Suitable organic peroxides include, but are not limited to, diacyl peroxides (e.g., RC(O)OOC(O)R', R/R'=alkyl or aryl), peroxyesters, peroxyketals, and dialkyl peroxides. Exemplary organic peroxides include dilauroyl peroxide; didecanoyl peroxide; dibenzoyl peroxide (DBPO); tert-butyl peroxyacetate; tert-butyl peroxyisobutyrate; tert-butyl peroxy-2-ethylhexanoate; tert-butyl peroxy-3,3,5-trimethyl hexanoate; tert-butyl peroxybenzoate; tert-butyl peroxy-2-ethylhexyl) carbonate; dicetyl peroxydicarbonate; butyl 4,4-di-(tert-butylperoxy)valerate; di-tert-butylperoxide (DTBP); di-tert-amyl peroxide; 1,1-bis(tert-butylperoxy)cyclohexane; 1,1-bis(tert-amylperoxy)cyclohexane; 1,1-bis(tert-butylperoxy)-3,3,5-trimethylcyclohexane; 2,2-bis(tert-butylperoxy)butane; dicumyl peroxide; tert-butylcumyl peroxide; 1,3-bis(tert-butylperoxy-isopropyl)benzene; 2,5-dimethyl-2,5-di(tert-butylperoxy)hexane; 3,6,9-triethyl-3,6, 9-trimethyl-1,4,7-triperoxonane; and 2,5-dimethyl-2,5-di (tert-butylperoxy)hexane.

Suitable organic diazo compounds include, but are not limited to, 2,2'-azobis(isobutyronitrile); 2,2'-azobis(2-methyl-butyronitrile); 2,2'-azobis(2,4-dimethylvaleronitrile); 2,2'-azobis(4-methoxy-2,4-dimethylvaleronitrile); 1,1'-azobis(1-cyclohexanecarbonitrile); 2,2'-azobis(isobutyramide)dehydrate; 2-phenyl azo-2,4-dimethyl-4-methoxyvaleronitrile; dimethyl-2,2'-azobisisobutyrate; 2-(carbamoylazo)isobutyronitrile; 2,2'-azobis(2,4,4-trimethylpentane); 2,2'-azobis(2-methylpropane); 2,2'-azobis(N,N'-dimethyleneisobutyramidine), free base or hydrochloride; 2,2'-azobis (2-amidinopropane), free base or hydrochloride; and 2,2'-azobis{2-methyl-N-[1,1-bis(hydroxymethyl)ethyl] propionamide} or 2,2'-azobis{2-methyl-N-[1,1-bis (hydroxymethyl)-2-hydroxyethyl]propionamide.

Monomers with Azide Functionality and Other Functionality

Suitable azide monomers include those monomers that contain at least one unsaturated C=C bond capable of reacting with a radical and at least one azide functional group. The azide monomer can be an aliphatic azide, or a macromonomer. For instance, the azide monomer may be represented by Formula (I):

$$R—R'-A-N_3 \qquad (I).$$

In Formula (I), R is H, vinyl, diene, maleimide, acrylate, methacrylate, vinyl acetate or combinations thereof. For instance, R is H, vinyl, maleimide, acrylate, or methacrylate.

R' is absent or a divalent organic radical derived from alkanes, cycloalkanes, heterocycloalkanes, heterocycloalkenes, alkylcycloalkanes, alkylheterocycloalkanes, arenes, heteroarenes, alkylarenes, alkylheteroarenes, alkylenediarylenes, dialkylcycloalkanes, alkyloxyalkanes, aryloxyarenes, alkaryloxyarenes, alkaryloxyalkarenes, aralkyloxyalkanes, aralkyloxyaralkanes, alkyl thioalkanes, arylthioarenes, alkarylthioarenes, alkaryl thiolkarenes, aralkylthioalkanes, aralkylthioaralkanes, alkylsulfonylalkanes, arylsulfonylarenes, alkarylsulfonylarenes, alkarylsulfonylalkarenes, aralkylsulfonylalkanes, aralkylsulfonylaralkanes, or combinations thereof. Each of the above groups may be substituted with one or more substituents, such as halogens or oxo. For instance, R' may be absent or a divalent organic radical derived from the group consisting of alkanes, heterocycloalkanes, arenes, heteroarenes, and combinations thereof; each of which may be optionally substituted with an oxo.

The azide monomer can be a macromonomer. In this case, R' is made up of multiple repeating units derived from various monomers. For example, R' can be made up of multiple ethylene repeating units, such as 100 ethylene repeating units.

A is absent, sulfonyl, acyl, oxy carbonyl (—OC(O)—, or carboxylate. For instance, A may be absent or sulfonyl.

In certain embodiments, R is H, vinyl, maleimide, acrylate, or methacrylate; R' is absent or a divalent organic radical derived from the group consisting of alkanes, heterocycloalkanes, arenes, heteroarenes, and combinations thereof, each of which may be optionally substituted with an oxo; and A is absent or sulfonyl.

In certain embodiments, R is vinyl; R' is divalent alkane or arene; and A is absent or sulfonyl.

In certain embodiments, R is acrylate or methacrylate; R' is divalent alkane or arene; and A is absent or sulfonyl.

In certain embodiments, R is maleimide; R' is divalent alkane or arene; and A is absent or sulfonyl.

In certain embodiments, R is H; R' is divalent heteroarenes; and A is absent or sulfonyl.

Exemplary azide monomers include

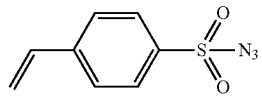

(4-styrene sulfonyl azide),

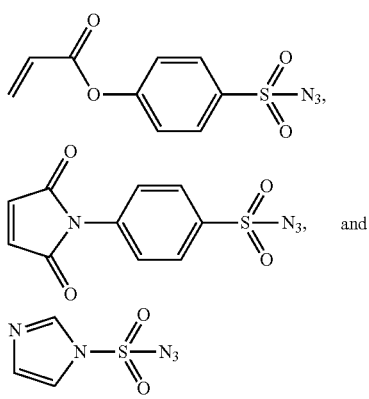

(imidazole-1-sulfonyl azide).

The azide monomer can have a decomposition temperature at or above the melting point and/or softening point of the free-radical-reactive polymer.

The grafting process may further comprise adding a bi-functional monomer that contains a non-azide functional group and at least one unsaturated C=C bond capable of reacting with a radical. The addition of this bi-functional monomer enables the grafting of the free-radical-reactive polymer with the non-azide functional group. The bi-functional monomer may be represented by Formula (II):

R—R'-A-X (II).

The definitions and preferred embodiments for the variables R, R', and A in Formula (II) are the same as the variables R, R', and A discussed above in Formula (I).

X is a non-reactive functional group (non-reactive in the grafting process and the reactive extrusion process) including, but not limited to, maleic anhydride, silane, thiol, amine, amide, alcohol, carboxylic acid, ester, dithioester, dithiocarbamate, dithiocarbonate, trithiocarbonate, alkoxyamine, or phosphorous-containing group. X may also be an anionic functional group, such as an acrylate salt, carboxylate salt, sulfonate salt, phosphonate salt; corresponding cationic groups include those known in the art, such as quaternary ammonium salts and other ammonium salts.

The addition of the bi-functional monomer(s) during the grafting process can add additional functionalities to the azide-grafted polymer, e.g., a non-reactive functional group, which, for the purpose of this invention, is non-reactive with the free-radical-reactive polymer or with the azide monomer during the grafting process as well as the later application process (e.g., reaction extrusion or coupling reaction using the azide-grafted polymer). Such non-reactive functional group can therefore be transferred to the azide-grafted polymer as well as the polymer formed in the later application process, to confer additional functionality, e.g., to improve polarity, paintability, surface adhesion, wettability, or compatibility with inorganic materials, etc.

For example, the bi-functional monomer may contain one unsaturated C=C bond to enable the grafting reaction, and a non-reactive functional group, such as maleic anhydride. The maleic anhydride group would not react with the free-radical-reactive polymer and the azide monomer during the grafting process and would not react during the later application process (e.g., reaction extrusion or coupling reaction using the azide-grafted polymer). The maleic anhydride group is therefore transferred to the azide-grafted polymer as well as the polymer formed in the later application process, to confer additional functionality. For instance, the maleic anhydride group can act as a modifier of the surface energy of the polymer, because this polar group would migrate to the surface of the polymer, which would increase the paintability. The maleic anhydride group can also improve the compatibility of the polymer with an inorganic particle, such as silica particles.

Process Conditions

The process for preparing the azide-grafted polymer is carried out under solid state (solid phase). The grafting process involves mixing the free-radical-reactive polymer feedstock in a solid phase (e.g., in powder, pellets, or flake form), a free-radical initiator, an azide monomer, and optionally one or more bi-functional monomers under grafting conditions to form the azide-grafted polymer.

The grafting process includes a free-radical grafting reaction between the free-radical-reactive polymer and the unsaturated C=C bond-containing azide monomer, that is initiated by the free-radical initiator. An exemplary initiation mechanism is illustrated in Scheme 1 below, in which R—OO—R is an exemplary peroxide initiator, and

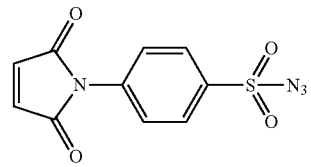 [SMILES: [N-]=[N+]=NS(=O)(=O)c1ccc(N2C(=O)C=CC2=O)cc1]

is used as an exemplary azide monomer to graft the azide functionality onto a polymer. After initiation, the radical chain reaction is subject to propogation and termination through mechanisms one skilled in the art would expect.

Scheme 1

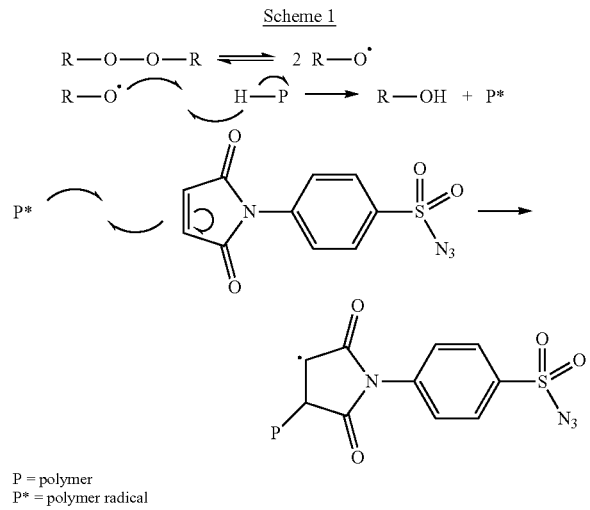

P = polymer
P* = polymer radical

The grafting process may be carried out in a vessel equipped with a heated temperature control, and some type of agitation (e.g., shaft with blades or paddles). The vessel may be purged with an inert gas such as nitrogen.

The process temperature can range from about 25° C. to about 250° C. The process temperature is controlled at a temperature (i) below the melting point and/or softening point of the free-radical-reactive polymer, (ii) below the decomposition temperature of the azide monomer, and (iii) at or above the decomposition temperature of the free-radical initiator. When a bi-functional monomer is used, the temperature is desirably controlled to be below the decomposition temperature of the bi-functional monomer. Each of these temperatures may vary depending on the free-radical-reactive polymer, the azide monomer, and the free-radical initiator selected. For instance, the decomposition temperature of an azide monomer or the free-radical initiator also depends on the structure of the compound. For instance, an alkyl azide has a higher decomposition temperature than that of a sulfonyl azide.

Moreover, the softening point or the melting point of the free-radical-reactive polymer, depends on the type of monomers, mole fraction of each comonomer if a copolymer, the molecular weight, and/or the tacticity of the free-radical-reactive polymer. For instance, for an isotactic or syndiotactic polymer, such as an isotactic or syndiotactic polymer or copolymer of propylene, the process temperature is at the temperature below the melting point of the isotactic polymer, e.g., at a temperature below about 170° C., below about 160° C., below about 150° C., below about 140° C., below about 130° C., below about 120° C., below about 110° C., or below about 100° C., or in a range of about 25° C. to about 170° C. For an atactic polymer, such as an atactic polymer or copolymer of propylene, the process temperature is at the temperature below the softening point of the atactic polymer, e.g., at a temperature below about 130° C., below about 120° C., below about 110° C., below about 100° C., below about 90° C., below about 80° C., or below about 70° C., or in a range of about 25° C. to about 130° C.

The decomposition temperature may be determined by Thermal Gravimetric Analysis (TGA) or other means known to one skilled in the art.

The reaction product, the resulting polymer with grafted azide functionality (or non-aizde functionality if one or more bi-functional monomers are used), is removed from the reaction vessel after a residence time sufficient to graft most of the azide functionality (or non-aizde functionality if one or more bi-functional monomers are used) to the free-radical-reactive polymer. The resulting grafted polymer is removed from the reaction vessel in a solid form (such as a powder, pellet, or flake), and may be used in that form.

The grafting process can be a batch process or a continuous process. If a continuous process is employed, the reaction products are continuously being removed, but are controlled to remain in the vessel for an average residence time sufficient to graft most of the azide functionality (or non-aizde functionality if one or more bi-functional monomers are used) onto the polymer.

Because the grafting process is run at a temperature below the decomposition temperature of the azide monomer, the azide functionality can be grafted to the free-radical-reactive polymer without any of the azide groups being decomposed or reacted. The resulting azide functional polymer can therefore be added to a polyolefin extrusion process as an additive, such as a polymeric coupling agent to produce a coupled polyolefin (e.g., a long-chain branched polyolefin).

Another advantage of this process is that chain scission of the polymer feedstock is minimized due to the low temperature of the process. This means that multiple azide monomers can be grafted onto a polyolefin chain as side groups and/or pendent groups as opposed to only the terminal ends of the polyolefin chain. This latter scenario can predominate if the reaction were to be carried out with a peroxide initiator at a relatively higher temperature.

Grafting the free-radical-reactive polymer at solid phases (which can employ the polymers in a powder or granular material, pellet, or flake form, that may be directly from the polymerization product) has great advantages, as compared to the grafting reactions in solution, suspension, or melt. For instance, the solid-state grafting process can have relatively lower cost than that in solution or suspension, at least because the avoidance of large amounts of solvents or suspending agents involved. A special advantage of solid-phase grafting of polypropylene (PP) is the fact that the degradation reaction is reduced. For instance, the degradation of isotactic polypropylene (iPP), via chain-scission reaction, takes place extensively when iPP is processed in the melt (at or above the melting temperature of iPP), whereas carrying out grafting of iPP in the solid state (below the melting temperature of iPP) can significantly reduce or eliminate the degradation of iPP via chain-scission reaction. As a result, the grafted-iPP polymer practically retains its original molecular weight.

The grafting process results in a free-radical-reactive polymer grafted with the azide functionality from the azide monomer and/or the non-azide functionality from the bi-functional monomer. Accordingly, another aspect of the invention relates to an azide-grafted polymer prepared according to the processes as discussed in the above embodiments.

All above descriptions and all embodiments discussed in the above aspect relating to a process for preparing an azide-grafted polymer, including the free-radical-reactive polymer, the free-radical initiator, the azide monomer, the bi-functional monomer, and the process conditions, are applicable to this aspect of the invention relating to an azide-grafted polymer prepared according to the process.

Because the free-radical-reactive polymer may contain one or more reactive sites for grafting reaction at one or more terminal ends of the polymer chain and/or on one or more repeating units, one or more functional groups (including the azide functionality from the azide monomer and the non-azide functionality from the bi-functional monomer) can be grafted to one or more of these reactive sites. For instance, the functional groups may be grafted to the polymer through the carbon-carbon double bond of the azide monomer.

In one embodiment, the resulting grafted polymer can contain one or more azide functional groups, from the azide monomer, grafted to the polymer at one or more terminal ends of the polymer chain and/or on one or more repeating units of the polymer as pendent groups.

In one embodiment, the resulting grafted polymer can contain one or more non-azide functional groups, from the bi-functional monomer, grafted to the polymer at one or more terminal ends of the polymer chain and/or on one or more repeating units of the polymer as pendent groups.

In one embodiment, the resulting grafted polymer can contain one or more azide functional groups, from the bi-functional monomer, as well as one or more non-azide functional groups, from the bi-functional monomer, grafted to the polymer at one or more terminal ends of the polymer chain and/or on one or more repeating units of the polymer as pendent groups.

Use of the Azide-Grafted Polymer
Use as a Polymeric Coupling Agent

The resulting azide-grafted polymer can be used as an additive in a polymer (e.g., polyolefin) extrusion process. For instance, the resulting azide-grafted polymer can be added to a polyolefin extrusion process as a polymeric coupling agent to produce a coupled polyolefin (e.g., a long-chain branched polyolefin). The details on the method of using an azide-functional polymer as a polymeric coupling agent can be found in U.S. Pat. No. 9,926,388, which is incorporated herein by reference in its entirety.

Accordingly, one aspect of the invention relates to a process of preparing a long-chain branched polymer. The process comprises reacting a polyolefin base polymer with a coupling agent comprising a polymeric coupling agent, optionally blended with a molecular coupling agent, to couple the polyolefin base polymer with the coupling agent to form a long-chain branched polymer having a long-chain branching and/or higher surface energy relative to the polyolefin base polymer. The polymeric coupling agent is an azide-grafted polymer, prepared by a process comprising mixing a free-radical-reactive polymer with a free-radical initiator and an azide monomer that contains at least one unsaturated C=C bond capable of reacting with a radical, under solid-state grafting conditions.

In this instance, the azide-grafted polymer is used as a polymeric coupling agent, that may be added to a coupling reaction, e.g., in a polyolefin extrusion process. The azide-grafted polymer is melt mixed with a polyolefin base polymer, prior to reaching the decomposition temperature of the polymeric coupling agent. At some point during this reactive extrusion process, the reaction temperature would be above the decomposition temperature of the polymeric coupling agent to form singlet nitrenes from the azide group of the polymeric coupling agent that react with the polyolefin base polymer chain to form covalent bonds. The result is a long chain branched polyolefin.

To form a long-chain branched polyolefin using the azide-grafted polymer as polymeric coupling agent, the amount of the azide monomer at the mixing step ranges from about 5 to about 90 wt %, for instance, from about 10 to about 80 wt %, or from about 10 to about 50 wt %. The free-radical-reactive polymer at the mixing step is desirably substantially amorphous, for instance, an atactic polymer.

In one exemplary application, the azide-grafted polymer is azide-grafted polypropylene, and can be used in the coupling reaction with polypropylene base polymer. The use of the azide-grafted popypropylene as the polymeric coupling agent has the advantages of having an improved chemical compatibility and a maximized ability to disperse the polymeric coupling agent in polypropylene. The polymeric coupling agent made by this process allows for the production of a long-chain branched polypropylene with a much higher degree of branching and a more homogenous branch architecture. This could improve the "re-extrusion stability" of the long-chain branched polypropylene (i.e., improve the amount of regrind that can be introduced to an extrusion foam process), as well as the performance of the long-chain branched polypropylene.

All above descriptions and all embodiments discussed in the above aspect relating to a process for preparing an azide-grafted polymer, including the free-radical-reactive polymer, the free-radical initiator, the azide monomer, the bi-functional monomer, and the process conditions, are applicable to this aspect of the invention relating to a process of preparing a long-chain branched polymer.

Suitable polyolefin base polymers are the same as those polyolefin polymers discussed in the above aspect relating to a process for preparing an azide-grafted polymer.

One or more molecular coupling agents can be blended with the polymeric coupling agent. If the polymeric coupling agents have relatively high thermal stability, a molecular coupling agent may be used to promote the coupling reaction between the polyolefin base polymer and the polymeric coupling agent. For instance, these molecular coupling agents can be added to promote the coupling reaction by generating radicals at a lower temperature thereby promoting the coupling reaction.

Exemplary molecular coupling agents include peroxides, such as di(4tert-butylcyclohexyl) peroxydicarbonate, di(tert-butylperoxyisopropyl)benzene, di(tert-butylperoxyisopropyl)benzene, di(4-methylbenzoyl) peroxide, dicetyl peroxydicarbonate, dimyristyl peroxydicarbonate, dicumyl peroxide, dibenzoyl peroxide, diisopropyl peroxydicarbonate, tert-butyl monoperoxymaleate, didecanoyl peroxide, dioctanoyl peroxide, 2,5-dimethyl-2,5-di(tert-butylperoxy)hexane, tert-butylperoxy-2-ethylhexyl carbonate, tert-amyl peroxy-2-ethylhexanoate, tert-amyl peroxyneodecanoate, tert-amyl peroxypivalate, tert-amyl peroxybenzoate, tert-amyl peroxyacetate, di-sec-butyl peroxydicarbonate, di(2-ethylhexyl) peroxydicarbonate, tert-butyl cumyl peroxide or combinations of these non-limiting examples; an alkyl borane, such as triethylborane, trimethylborane, tri-n-butyl-borane, triisobutylborane, diethylborane methoxide, or diethylborane isopropoxide or combinations of these non-limiting examples; azo compounds such as azobisisobutyronitrile (AIBN) or 1,1'-azobis(cyclohexanecarbonitrile) (ABCN), 1,1'-azodi(hexahydrobenzonitrile, 2,2'-Azodi (hexahydrobenzonitrile, 2,2'-azodi(2-methylbuttyronitrile, or combinations of these non-limiting examples; azide compounds such as 4,4'-oxybis(benzenesulfonyl azide), 4-dodecylbenzensulfonyl azide, benzenesulfonyl azide, 4-(2-trimethoxysilylethyl) benzenesulfonyl azide, 4-methylbenzenesulfonyl azide, 2,4,6-triisopropylbenzenesulfonyl azide, 1,3-benzenedisulfonyl azide, 1,4-benzenedisulfonyl azide; or combinations of these non-limiting examples.

One or more molecular coupling agents can be blended with the polymeric coupling agent. If the polymeric coupling agents have relatively high thermal stability, a molecular coupling agent may be used to promote the coupling reaction between the polyolefin base polymer (a) and the polymeric coupling agent. For instance, these molecular coupling agents can be added to promote the coupling reaction by generating radicals at a lower temperature thereby promoting the coupling reaction.

Exemplary molecular coupling agents include peroxides, such as di(4tert-butylcyclohexyl) peroxydicarbonate, di(tert-butylperoxyisopropyl)benzene, di(tert-butylperoxyisopropyl)benzene, di(4-methylbenzoyl) peroxide, dicetyl peroxydicarbonate, dimyristyl peroxydicarbonate, dicumyl peroxide, dibenzoyl peroxide, diisopropyl peroxydicarbonate, tert-butyl monoperoxymaleate, didecanoyl peroxide, dioctanoyl peroxide, 2,5-dimethyl-2,5-di(tert-butylperoxy)hexane, tert-butylperoxy-2-ethylhexyl carbonate, tert-amyl peroxy-2-ethylhexanoate, tert-amyl peroxyneodecanoate, tert-amyl peroxypivalate, tert-amyl peroxybenzoate, tert-amyl peroxyacetate, di-sec-butyl peroxydicarbonate, di(2-ethylhexyl) peroxydicarbonate, tert-butyl cumyl peroxide or combinations of these non-limiting examples; an alkyl borane, such as triethylborane, trimethylborane, tri-n-butyl-borane, triisobutylborane, diethylborane methoxide, or diethylborane isopropoxide or combinations of these non-limiting examples; azo compounds such as azobisisobutyronitrile (AIBN) or 1,1'-azobis(cyclohexanecarbonitrile) (ABCN), 1,1'-azodi(hexahydrobenzonitrile, 2,2'-Azodi (hexahydrobenzonitrile, 2,2'-azodi(2-methylbuttyronitrile, or combinations of these non-limiting examples; azide compounds such as 4,4'-oxybis(benzenesulfonyl azide), 4-dodecylbenzensulfonyl azide, benzenesulfonyl azide, 4-(2-trimethoxysilylethyl) benzenesulfonyl azide, 4-methylbenzenesulfonyl azide, 2,4,6-triisopropylbenzenesulfonyl azide, 1,3-benzenedisulfonyl azide, 1,4-benzenedisulfonyl azide; or combinations of these non-limiting examples.

The reaction temperature of the coupling reaction between the polyolefin base polymer the coupling agent (containing polymeric coupling agent or polymeric/molecular coupling agent blend) can be greater than 140° C., or greater than 220° C.

The azide-grafted polymer can decompose in several ways. (The process of the invention is not intended to be bound by different reaction mechanisms.) As an example, insertion of the azide-grafted polymer as a polymeric coupling agent into a polyolefin base polymer generally occurs through the thermal decomposition of the azide group. At or above the first decomposition temperature of the azide-grafted polymer or the first decomposition temperature of the polymeric/molecular coupling agent blend, the polymeric coupling agent generates nitrene species (aza derivatives), acting as an efficient coupling agent to react with the polyolefin base polymer. See, e.g., the reaction scheme in Scheme 2.

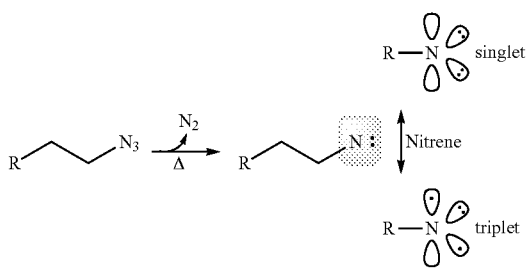

Scheme 2.

Advantageously, at or above the first decomposition temperature of the azide-grafted polymer or the first decomposition temperature of the polymeric/molecular coupling agent blend, the azide-grafted polymer is capable of a self-coupling reaction (in the polymeric coupling agent or the polymeric/molecular coupling agent blend), in which the formed azo radical groups reacts with other polymeric coupling agent chains. Thus, in certain embodiments, the polymeric coupling agent self-couples to form a self-coupled coupling agent capable of reacting with the polyolefin base polymer.

Additional details on the coupling reaction between the azide-grafted polymer and the polyolefin base polymer, including mixing conditions, equipment and reaction vessels for mixing and reacting, and reaction kinetics, can be found in U.S. Pat. No. 9,926,388, which is incorporated herein by reference in its entirety.

The embodiments of the invention also relate to a long-chain branched polymer prepared according to the processes described in this aspect of the process.

Use as a Functional Polymer

Alternatively, the azide-grafted polymer can be used by itself to prepare a long-chain branched or crosslinked polymer. Accordingly, one aspect of the invention relates to a process of preparing a polymer, comprising exposing an azide-grafted polymer to a temperature at or above the decomposition temperature of an azide-grafted polymer to form nitrenes from the azide group of the azide-grafted polymer that react with the azide-grafted polymer to form a long-chain branched or crosslinked polymer. The azide-grafted polymer is prepared by a process comprising mixing a free-radical-reactive polymer with a free-radical initiator and an azide monomer that contains at least one unsaturated C=C bond capable of reacting with a radical, under solid-state grafting conditions.

All above descriptions and all embodiments discussed in the above aspect relating to a process for preparing an azide-grafted polymer, including the free-radical-reactive polymer, the free-radical initiator, the azide monomer, the bi-functional monomer, and the process conditions, are applicable to this aspect of the invention relating to a process of preparing a long-chain branched polymer.

In certain embodiments, the azide-grafted polymer is directly used for preparing a long-chain branched polymer. For instance, the azide-grafted polymer can be extruded at a temperature at or above the decomposition temperature of the azide-grafted polymer to form nitrenes, from the azide group of the azide-grafted polymer, to react with the azide-grafted polymer to form a long-chain branched polymer.

To form a long-chain branched polymer in this application, the free-radical-reactive polymer at the mixing step desirably has a low amorphous content, for instance, an amorphous content of about 40% or less, such as an isotactic polymer or syndiotactic polymer (e.g., a semicrystalline polypropylene or polyethylene). The amount of the azide monomer at the mixing step is relatively low, e.g., ranging from about 0.1 to about 15 wt %, so that when the azide-grafted polymer decomposes to form nitrenes that react with the azide-grafted polymer, the azide-grafted polymer becomes lightly cross-linked with each other to the point of long-chain branching (and can have a higher surface energy relative to the azide-grafted polymer). In one embodiment, the free-radical-reactive polymer is polyolefin such as polypropylene; the resulting polymer is a long-chain branched polyolefin such as long-chain branched polypropylene (e.g., in a pellet form), which can have a high melt strength.

In certain embodiments, the azide-grafted polymer is subjected to a extrusion or molding process before the use for preparing a cross-linked polymer. For instance, the azide-grafted polymer is subjected to an extrusion or molding process at a temperature at or above the melting point and/or softening point of the azide-grafted polymer, but below the decomposition temperature of the azide-grafted polymer, to form an extruded or molded profile containing the azide-grafted polymer. The extruded or molded profile containing the azide-grafted polymer is then exposed to a temperature at or above the decomposition temperature of the azide-grafted polymer to form nitrenes, from the azide group of the azide-grafted polymer, that react with the azide-grafted polymer to form a cross-linked polymer.

To form a cross-linked polymer in this application, the azide monomer at the mixing step desirably has a decomposition temperature that is at or above the melting point and/or softening point of the free-radical-reactive polymer. For example, an alkyl azide, having a relatively high decomposition temperature, can be used at the mixing step. The free-radical-reactive polymer at the mixing step desirably has a low amorphous content, for instance, an amorphous content of about 40% or less, such as an isotactic polymer or syndiotactic polymer (e.g., a semicrystalline polypropylene or polyethylene). In one embodiment, the free-radical-reactive polymer is polyolefin such as polypropylene; the resulting polymer is a profile containing a cross-linked polyolefin such as cross-linked polypropylene.

The embodiments of the invention also relate to a long-chain branched or crosslinked polymer prepared according to the processes described in this aspect of the process.

We claim:

1. A process for preparing an azide-grafted polymer, comprising:
reacting a free-radical-reactive polymer with a free-radical initiator and an azide monomer that contains at least one unsaturated C=C bond, under solid-state grafting conditions, to form an azide-grafted polymer.

2. The process of claim 1, wherein the free-radical-reactive polymer is a polyolefin, polydiene, or a blend thereof; a copolymer of olefin monomer(s) and/or diene monomer(s); a polymer of a styrenic monomer; a copolymer of styrenic monomer(s) with olefin monomer(s), diene monomer(s), or acrylic monomer(s); a halogen-containing polymer; or a polymer or copolymer derived from α,β-unsaturated acid(s) or derivatives thereof.

3. The process of claim 2, wherein the free-radical-reactive polymer is a polyolefin polydiene, or a blend thereof; or a copolymer of olefin monomer(s) and/or diene monomer(s),
wherein the olefin monomer or diene monomer is selected from the group consisting of ethylene; propylene; 1-butene; 2-butene; 1,3-butadiene; 2-methylpropene (isobutylene);
1-pentene; 1,3-pentadiene; 1,4-pentadiene; 2-methyl-1,3-butadiene (isoprene); 3-methyl-1-butene; 3-methyl-1,4-pentadiene; 3,3-dimethyl-1,4-pentadiene; 1-hexene; 1,3-hexadiene; 1,4-hexadiene; 1,5-hexadiene; 4-methyl-1-pentene; 3-methyl-1-pentene; 3-methyl-1,5-hexadiene; 3,4-dimethyl-1,3-hexadiene; 3,4-dimethyl-1,5-hexadiene; 4,6-dimethyl-1-heptene; 1,3-heptadiene; 1,4-heptadiene; 1,5-heptadiene; 1,6-heptadiene; 1-octene; 1,3-octadiene; 1,4-octadiene; 1,5-octadiene; 1,6-octadiene; 1,7-octadiene; 2-methyl-1,3-octadiene; 3-ethyl-1,5-octadiene; 4,5-diethyl-1,3-octadiene; 1-decene; 1-undecene; 1-dodecene; 1-tetradecene; 1-hexadecene; 1-octadecene; 1-eicocene; cyclooctene; norbornene; substituted norbornene; and combinations thereof.

4. The process of claim 3, wherein the free-radical-reactive polymer is polyethylene, polypropylene, copolymer of polyethylene and polypropylene, polybutadiene or polyisoprene, polystyrene, styrene block copolymers, ethylene-propylene diene methylene rubber (EPDM rubber), ethylene-propylene rubber (EPR), styrene-butadiene-styrene rubber (SBS rubber), or styrene-ethylene-butylene-styrene rubber (SEBS rubber).

5. The process of claim 1, wherein the free-radical-reactive polymer has an amorphous content ranging from about 1% to about 100%.

6. The process of claim 5, wherein the free-radical-reactive polymer is an atactic polymer, or an isotactic or syndiotactic polymer.

7. The process of claim 1, wherein the free-radical-reactive polymer has a softening point of 70° C. or higher.

8. The process of claim 1, wherein the free-radical initiator is an organic peroxide or an organic diazo compound.

9. The process of claim 8, wherein the free-radical initiator is an organic peroxide selected from the group consisting of a diacyl peroxide, peroxyester, peroxyketal, and dialkyl peroxide.

10. The process of claim 9, wherein the organic peroxide is dilauroyl peroxide; didecanoyl peroxide; dibenzoyl peroxide (DBPO); tert-butyl peroxyacetate; tert-butyl peroxyisobutyrate; tert-butyl peroxy-2-ethylhexanoate; tert-butyl peroxy-3,3,5-trimethyl hexanoate; tert-butyl peroxybenzoate; tert-butyl peroxy-2-ethylhexyl) carbonate; dicetyl peroxydicarbonate; butyl 4,4-di-(tert-butylperoxy) valerate; di-tert-butylperoxide (DTBP); di-tert-amyl peroxide; 1,1-bis(tert-butylperoxy)cyclohexane; 1,1-bis(tert-amylperoxy)cyclohexane; 1,1-bis(tert-butylperoxy)-3,3,5-trimethylcyclohexane; 2,2-bis(tert-butylperoxy)butane; dicumyl peroxide; tert-butylcumyl peroxide; 1,3-bis(tert-butylperoxy-isopropyl)benzene; 2,5-dimethyl-2,5-di(tert-butylperoxy)hexane; 3,6,9-triethyl-3,6,9-trimethyl-1,4,7-triperoxonane; or 2,5-dimethyl-2,5-di(tert-butylperoxy)hexane.

11. The process of claim 1, wherein the azide monomer is represented by Formula (I):

$$R\text{—}R'\text{-}A\text{-}N_3 \qquad (I),$$

wherein:
R is H, vinyl, diene, maleimide, acrylate, methacrylate, vinyl acetate, or combinations thereof;
R' is absent or a divalent organic radical derived from alkanes, cycloalkanes, heterocycloalkanes, heterocycloalkenes, alkylcycloalkanes, alkylheterocycloalkanes, arenes, heteroarenes, alkylarenes, alkylheteroarenes, alkylenediarylenes, dialkylcycloalkanes, alkyloxyalkanes, aryloxyarenes, alkaryloxyarenes, alkaryloxyalkarenes, aralkyloxyalkanes, aralkyloxyaralkanes, alkyl thioalkanes, arylthioarenes, alkarylthioarenes, alkaryl thiolkarenes, aralkylthioalkanes, aralkylthioaralkanes, alkylsulfonylalkanes, arylsulfonylarenes, alkarylsulfonylarenes, alkarylsulfonylalkarenes, aralkylsulfonylalkanes, aralkylsulfonylaralkanes, or combinations thereof; each of which may be substituted with one or more of halogens or oxo; and
A is absent, sulfonyl, acyl, oxy carbonyl (—OC(O)—), or carboxylate, provided that one of R and R' contains at least one unsaturated C=C bond.

12. The process of claim 11, wherein:
R is H, vinyl, maleimide, acrylate, methacrylate, or diene;
R' is absent or a divalent organic radical derived from the group consisting of alkanes, heterocycloalkanes, heterocycloalkene, arenes, heteroarenes, and combinations thereof, each of which may be optionally substituted with an oxo; and
A is sulfonyl.

13. The process of claim 12, wherein the azide monomer is

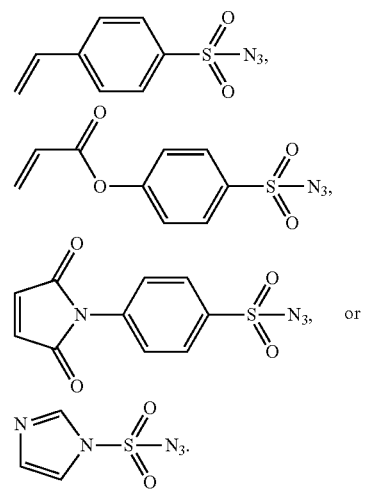

14. The process of claim 12, wherein the azide monomer has a decomposition temperature at or above the melting point and/or softening point of the free-radical-reactive polymer.

15. The process of claim 1, wherein the solid-state grafting conditions include mixing at a temperature (i) below the melting point and/or softening point of the free-radical-reactive polymer, (ii) below the decomposition temperature of the azide monomer, and (iii) at or above the decomposition temperature of the free-radical initiator.

16. The process of claim 1, wherein the process further comprises adding a bi-functional monomer that contains a non-azide functional group and at least one unsaturated C=C bond to graft the free-radical-reactive polymer with the non-azide functional group.

17. An azide-grafted polymer prepared according to the process of claim 1.

18. The azide-grafted polymer of claim 17, wherein one or more azide groups, from the azide monomer, are grafted to the polymer through the carbon-carbon double bond of the azide monomer at one or more terminal ends of the polymer chain and/or on one or more repeating units of the polymer as pendent groups.

19. The process of claim 2, wherein the free-radical-reactive polymer is a copolymer of olefin monomer(s) and/or diene monomer(s), with an vinyl monomer.

20. The process of claim 2, wherein the free-radical-reactive polymer is a copolymer derived from $\alpha,\beta$-unsaturated acid(s) or derivatives thereof, with another unsaturated monomer.

21. The process of claim 2, wherein the free-radical-reactive polymer is a polymer of a styrenic monomer.

22. The process of claim 2, wherein the free-radical-reactive polymer is a copolymer of styrenic monomer(s) with olefin monomer(s), diene monomer(s), or acrylic monomer(s).

23. The process of claim 2, wherein the free-radical-reactive polymer is a halogen-containing polymer.

24. The process of claim 5, wherein the free-radical-reactive polymer has an amorphous content of about 40% or less.

25. The process of claim 6, wherein the free-radical-reactive polymer is an atactic polymer.

* * * * *